US006438740B1

(12) United States Patent
Broder et al.

(10) Patent No.: US 6,438,740 B1
(45) Date of Patent: Aug. 20, 2002

(54) SYSTEM AND METHOD FOR DYNAMICALLY IDENTIFYING FREE REGISTERS

(75) Inventors: Andrei Zary Broder, Menlo Park; Michael Burrows, Palo Alto; Monika Hildegard Henzinger, Menlo Park, all of CA (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 08/915,701

(22) Filed: Aug. 21, 1997

(51) Int. Cl.[7] .................................................. G06F 9/45
(52) U.S. Cl. ............................ 717/8; 717/9; 712/228
(58) Field of Search ................................. 395/704, 705, 395/700; 717/8, 9; 712/9, 218, 217, 228

(56) References Cited

U.S. PATENT DOCUMENTS

| 4,378,590 | A | * | 3/1983 | Kim | 709/104 |
|---|---|---|---|---|---|
| 5,197,132 | A | * | 3/1993 | Steely et al. | 712/217 |
| 5,339,238 | A | * | 8/1994 | Benson | 717/7 |
| 5,339,428 | A | * | 8/1994 | Burmeister et al. | 717/7 |
| 5,355,457 | A | * | 10/1994 | Shebanow | 712/218 |
| 5,367,696 | A | * | 11/1994 | Abe | 395/705 |
| 5,428,786 | A | * | 6/1995 | Sites | 717/9 |
| 5,530,866 | A | * | 6/1996 | Koblenz et al. | 395/708 |
| 5,815,719 | A | * | 9/1998 | Goebel | 395/707 |
| 5,815,720 | A | * | 9/1998 | Buzbee | 717/9 |
| 6,139,200 | A | * | 10/2000 | Goebel | 395/709 |

* cited by examiner

Primary Examiner—Zarni Maung
Assistant Examiner—George L. Opie
(74) Attorney, Agent, or Firm—Pennie & Edmonds LLP

(57) ABSTRACT

A system and method for identifying free registers within a program. A depth first search of a flow diagram representing the execution of a program is performed. The search proceeds simultaneously for all the registers and identifies the free registers from the search. The free registers may then be utilized for various applications without saving and restoring the contents of these registers to memory. The system may limit the amount of time spent searching for free registers with a timer.

30 Claims, 10 Drawing Sheets

| | REGISTERS USED | | |
|---|---|---|---|
| PATCH 1 | R2 | R5 | R7 |
| PATCH 2 | R3 | R5 | R8 |
| PATCH 3 | R6 | R7 | R8 |

LOCATION A FREE REGISTERS: R2, R3, R6, R7, R8

FIG. 8

SYSTEM AND METHOD FOR DYNAMICALLY IDENTIFYING FREE REGISTERS

FIELD OF THE INVENTION

This invention relates to computer systems and, more particularly, to identifying free registers in a computer.

BACKGROUND OF THE INVENTION

During the execution of a computer program, a register "R" is called "free" if, for all possible execution paths of a program from that particular point forward, the content of R is always written before being read. If register R is not free then it is said to be in use.

Knowing whether a register is free or in use is important for many reasons. For example, when calling subroutines, if the free registers are known, then the contents of the free registers do not have to be saved upon entry to the subroutine and restored upon return from the subroutine. This saves processing time which would otherwise be required to store and restore data to/from memory in order to ensure that the use of a register while executing the subroutine does not interfere with subsequent program execution. Thus, a determination of which registers are free at various points while executing a program is typically performed during program compiling and is an important aspect in compiler design in the context of assignment of registers.

A conventional method of locating free registers during compiling is illustrated in FIG. 1. The first step in this method is to construct a complete flow graph. Next, for each register the edges of the graph are explored backwards, starting from each Read instruction from that register and stopping at all Write instructions to that register. At each point that is reached before a Write is reached, that particular register is marked as "in-use" or not free.

For example, in FIG. 1, for register R1 the flow graph is examined from the Read 1 at 50. Working backwards from the Read 1 at 50, each execution path reaches a Write at 52 before a point of interest 55 is reached. Therefore, register R1 is a free register at 55. For register R2 the flow graph is also examined backwards from each Read 2 statement. From the Read 2 at 54, the search reaches point 55 before a Write is reached. Therefore, register R2 is not a free register at 55.

This type of search requires analysis of the entire program and sometimes even with an entire code analysis, the system cannot make complete determinations. This is because jumps and branches within the program may require the searching algorithm to make pessimistic assumptions regarding the status of a particular register. Further, this type of search for free registers requires an amount of time which makes its use impractical during program execution.

Free registers are also required in order to implement a software "patch." A program may require a software patch to replace small portions of the original executable code with new code. The patch may be required for debugging the program, instrumentation, architecture emulation, or other reasons which are well known to those skilled in the art.

For example, in situations where an upgraded program is being run on an existing computer architecture that does not include upgraded hardware, the upgraded program may have instructions which are not executable on the older architecture. To correct this problem, a patch that emulates the upgraded hardware is inserted into the program.

When modules of a program are mapped to memory, word or page alignment of the modules may result in "free space" between aligned modules. Prior art FIG. 2 illustrates a typical program stored in memory. The program includes four modules 205–220, with free space 225–240 located between the modules. A patch can be inserted into the free space during linking or loading, or while the program is executing.

With reference to prior art FIG. 3, new source code 300 represents the patch. A compiler 310 compiles the patch and sends the compiled code to a linker 320. The linker 320 then links the compiled patch code with original program executable code 330 so that the processor can execute the program patch. The linker 320 may also be coupled to various libraries 340 that contain previously compiled code. The details of linking the patched code with the executable code are well known by those skilled in the art and accordingly will not be further described herein.

Conventionally, when a patch is needed for a program, the contents of all required registers are saved to memory and then restored after the patch is executed. This may result in a serious performance penalty during program execution. For example, the time spent storing and restoring the contents of the registers to/from memory may slow the operation of the program to the point where the program execution is unacceptable. This is particularly true in cases where the patch is executed in a loop with many iterations.

Prior art FIG. 4 illustrates a conventional patch executed within a program. At the step labeled 10, the program is executing. At step 12, a jump to the patch occurs. The program proceeds at step 14 to save the contents of required registers to memory or stack. In step 16, the patch is executed. Upon completion of the patch execution, the program restores the registers as indicated at step 18 and jumps back to the program execution at step 20. In other implementations, a patch can directly be inserted in the executable code.

In view of the above, a need exists for an improved technique to locate free registers within a program.

OBJECTIVES OF THE INVENTION

Accordingly, it is an object of the invention to locate free registers in an efficient manner. The free registers can then be utilized for various purposes, such as a software patch.

Another object of the invention is to execute a software patch without saving and restoring the content registers to memory.

A further object of the invention is to dynamically locate free registers while a program is executing without undue delays.

Yet another object of the invention is to reduce the number of instances of the same patch stored in memory.

Other objects and advantages of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

SUMMARY OF THE INVENTION

To achieve the foregoing and other object and advantages, the present invention provides a technique for locating free registers within a plurality of registers. In accordance with the invention, a point of interest within an execution flow of a program, e.g., a point at which a jump to a patch will be eventually inserted, is selected. A search is performed from the point of interest to locate registers that will be written prior to being read, subsequent to, i.e., downstream of, the point of interest in the program's execution flow. The search is performed by using a flow graph constructed by analyzing the execution flow.

In accordance with other aspects of the invention, the search associated with a particular register is terminated when the particular register is determined to be in use. The identity of the located free registers may be stored for later use by, for example, a patch. The patch may then be executed by writing data in the identified free registers. Additionally, saved search results may be utilized by other searches that may overlap the saved results. Further, if desired, the flow graph may be searched for more than one free register at the same time or searched from more than one point of interest at the same time.

In further aspects of the invention, a timer may be started when the search for free registers begins, and the search can be terminated when the timer times out.

According to one embodiment of the invention, a computer system performs the steps for identifying free registers. The computer system includes a processor executing sequences of instructions contained in a computer-readable medium. This medium may, for example, be dynamic random access memory (DRAM). Alternatively, the medium could be any other data storage device that would be known to one of ordinary skill in the art.

BRIEF DESCRIPTION OF THE DRAWINGS

FIG. 8 is a diagram illustrating the re-use of a patch stored in memory in accordance with the present invention.

DETAILED DESCRIPTION OF A PREFERRED EMBODIMENT OF THE INVENTION

The system of the present invention searches a flow graph of a program for free registers. The system may search all or only a portion of the flow graph that is accessible from a point of interest, because in some instances, the flow graph cannot be completely determined, or is very time-consuming to be determined.

Figure 5:
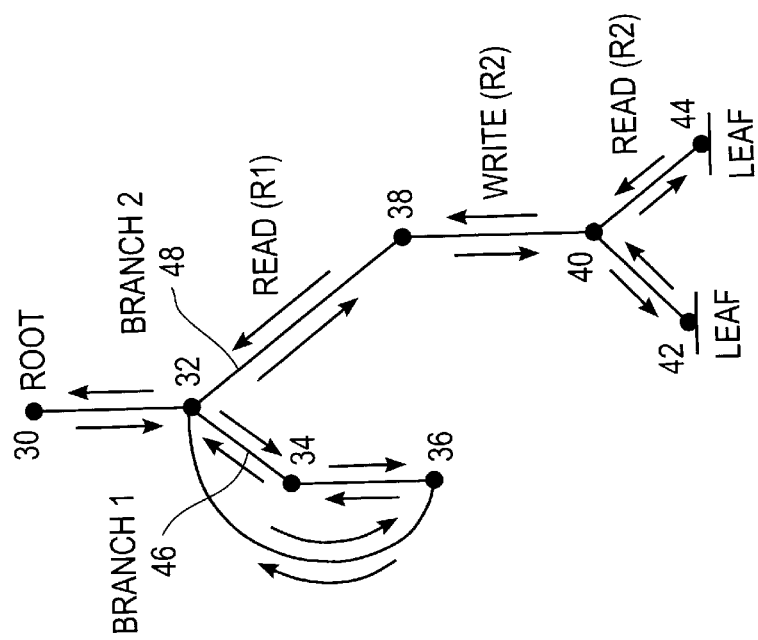
FIG. 5 shows a flow graph used to locate free registers according to the present invention.

FIG. 5 illustrates a flow graph 50 of register accesses during program execution which can be used in locating free registers in accordance with the present invention. The illustration graphs the access flows for three registers: R1, R2 and R3. However, the invention may be used for any size program utilizing any number of registers. The access flow begins at a point of interest. The point of interest in the exemplary embodiment is the location in the program where, for example, a patch will be called, i.e., where a jump or branch to a patch will occur. It should, however, be recognized that the point of interest may be the start of the program or any other location within the program at which the user wishes to identify free registers.

The point of interest, labeled as 30 in FIG. 5, is referred to as the Root. The nodes in the flow graph of FIG. 5 are labeled as 32, 34, 36, 38, 40, 42 and 44. These nodes represent branch points of a program or destinations of branch points, i.e., points where execution branches from or to.

For example, node 32 may represent an IF-THEN statement, and the program flows to either branch 1, labeled as 46, or branch 2, labeled as 48. Sequences of instructions exist between the nodes. These sequences of instructions are referred to as "edges" of the graph 50. An execution path is a sequence of connected edges in the flow graph.

In the exemplary embodiment, only a portion of the program is examined. Therefore, branches outside the portion of the program being examined are not searched. By searching only a portion of the program for free registers, critical time is saved in the search. However, if desired, the entire program may be examined with various assumptions made for the unreachable portions of the graph.

Since only a portion of the program is examined, there may exist nodes in the flow graph whose outgoing edges are not analyzed. Additionally, there might be nodes whose outgoing edges cannot be easily analyzed, such as computed jumps. In this case, nodes are represented as having no outgoing edges and pessimistic assumptions regarding the use of registers at such nodes are made. These terminating nodes of the graph nodes are referred to as leaves.

An example of a leaf may be a computed jump instruction in which the destination of the jump is not easily determined, because the destination may vary dynamically for a particular execution. That is, different executions can have different destinations. In FIG. 5, nodes 42 and 44 have no outgoing edges, and hence each of these nodes is a leaf.

In order to locate free registers, a Depth First Search (DFS) is performed on the flow graph. The DFS proceeds from the Root and searches recursively along the edges extending from each node in a single branch until all the nodes reachable via that branch are reached. Then it continues with the next branch from that node. The search then continues for other branches until all the branches have been searched.

Figure 6:
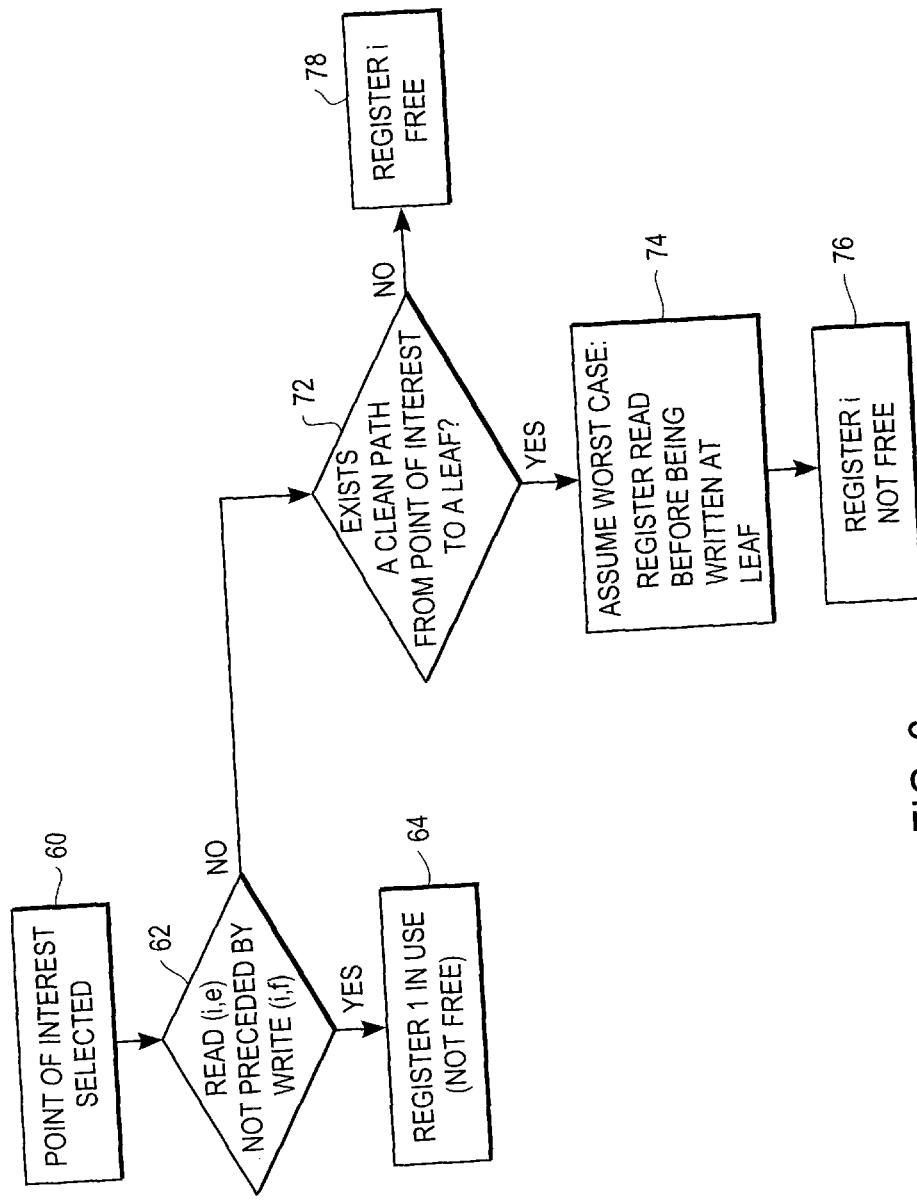
FIG. 6 is a flow diagram illustrating the method steps performed in locating free registers in accordance with the present invention.

FIG. 6 is a simplified flow diagram illustrating the steps used in accordance with the invention. An example of pseudo-code for implementing the method illustrated in FIGS. 5 and 6 is shown in Appendix A. The search for free registers is based on the following three predicates:

Write (i,e) is true, if there exists an instruction on an edge "e" that uses a register "i", and the first such instruction overwrites the content of register "i" without using, i.e., reading, the contents.

Read (i,e) is true, if there exists an instruction on edge "e" that uses register "i", and the first such instruction uses the contents of register "i".

If both Write (i,e) and Read (i,e) are false, then edge "e" is said to be "clean with respect to register i". A path is said to be clean with respect to "i" when it is composed entirely of clean edges with respect to "i".

A worst case assumption is made for each leaf encountered. In other words, for each leaf, the system assumes that all registers are read following a leaf before a write occurs for any of those registers.

With reference to FIG. 6, a point of interest is selected at step 60. A determination is made whether an execution path from the point of interest contains an edge "e" with Read (i,e) is not preceded by any edge "f" with Write (i,f) at step 62. If such a path exists, then the particular register "i" is marked as "in use" or not free at step 64. If the answer to the determination made in step 62 is "no", then at step 72, a determination is made whether there exists a clean path from the point of interest to a leaf, i.e., a clean path for register "i" that terminates at a leaf. If the answer to the determination in step 72 is "no", then the register "i" is marked as free at step 78. If the answer to the determination in step 72 is "yes", the worst case assumption is made at step 74, that is, the register is assumed to be read before being written after the leaf is reached. At step 76, such registers are identified as not free.

Therefore, a register "i" is free at a Root if, and only if, within every path from the Root that contains an edge "e" with Read (i,e), the register "i" has, preceding the edge "e", an edge "f" with Write (i,f), and there is no clean path with respect to "i" from the Root to a leaf. With reference to FIG. 5, the search begins at Root 30. The edges between Root 30 and node 32 are searched, and the Writes and Reads for all the various registers are tracked concurrently, i.e., in parallel. This concurrent search of the flow graph takes less processing time than the conventional searching technique used in program compilation which conducts the search for free registers one register at a time.

The DFS reaches branch node 32. The DFS may be programmed to search the left side of the tree first and then the right side. Alternatively, the right-hand side of the tree may be searched first. The arrows between the nodes in FIG. 5 indicate the direction of the DFS in accordance with the detailed description below.

Assuming that the left branch, branch 1, is searched first, the search proceeds for the edges between node 32 and 34. The search then proceeds for the edges between nodes 34 and 36. At node 36, the program loops back to node 32. The search proceeds to 32, and then backtracks to 36, then backtracks to 34, then backtracks to 32. The search then proceeds down the right branch, branch 2, and the system searches the edges between nodes 32 and 38. At this point, a Read of register R1 occurs in one of the edges between nodes 32 and 38. Since the Read of register R1 is not preceded by a Write of register R1, the register R1 is marked as "in use".

The search associated with register R1 terminates at this point, since R1 has been determined to be "in use", or not free. By terminating searches once a particular register, such as register R1, is determined not to be free, time spent searching is reduced.

The search continues from node 38, and the Write of register R2 occurs. The search proceeds to node 40, and at node 40, the search continues down the left branch to leaf 42. The search stops at leaf 42 and an assumption is made that there are no free registers beyond this point. In other words, it is assumed that after leaf 42, in the outgoing edges not shown, a Read of registers R1, R2 and R3 will occur before a Write of the registers R1, R2 and R3, respectively.

The search proceeds back to node 40 and the right branch is searched to node 44. During this portion of the search, the Read of register R2 occurs. At node 44, the leaf is encountered and similar to leaf 42, it is assumed that there are no free registers beyond this point.

From the search of the portion of the graph shown in FIG. 5, register R2 is identified as free because the Write of register R2 is not preceded by a Read of register R2, and there are no clean paths with respect to register R2 from the Root to a leaf. Register R3 is identified as not free, because a clean path exists from the Root to leaf 42 with respect to register R3. This is an example of the worst case assumption when the search encounters a leaf.

Even though register R3 was not explicitly read from or written to in the portion of the flow graph searched, a clean path with respect to register R3 from the Root to a leaf results in register R3 being designated as not free. A clean path with respect to register R3 also exists between the Root and node 44. However, once register R3 was found to be not free at node 42, the search associated with register R3 terminates. Accordingly, no search of the right branch at node 40 is made with respect to register R3.

The DFS continues until the entire tree has been traversed or until all of the registers have been determined to be in use. As discussed above, the DFS concurrently searches the graph for Reads and Writes associated with all of the registers and does not search the flow graph for one register at a time. The addresses of the registers found to be "in use" (not free) are stored in a set. Alternatively, the addresses of the registers that are free could be stored, or the addresses of both the free registers and the in use registers could be respectively stored in separate sets.

The DFS of the present invention is preferably performed on-line, i.e., dynamically. That is, the DFS is performed as part of the program execution. When a jump to a patch must be inserted in the program, the search for free registers begins from the point of the program where the patch is to be used. In other words, Root 30 in FIG. 5 may be the point where a patch will be called in the program.

The trade-off between the time spent searching for free registers to be used by the patch and the time spent saving and restoring registers associated with a normal patch are considered in the present invention.

Figure 7:
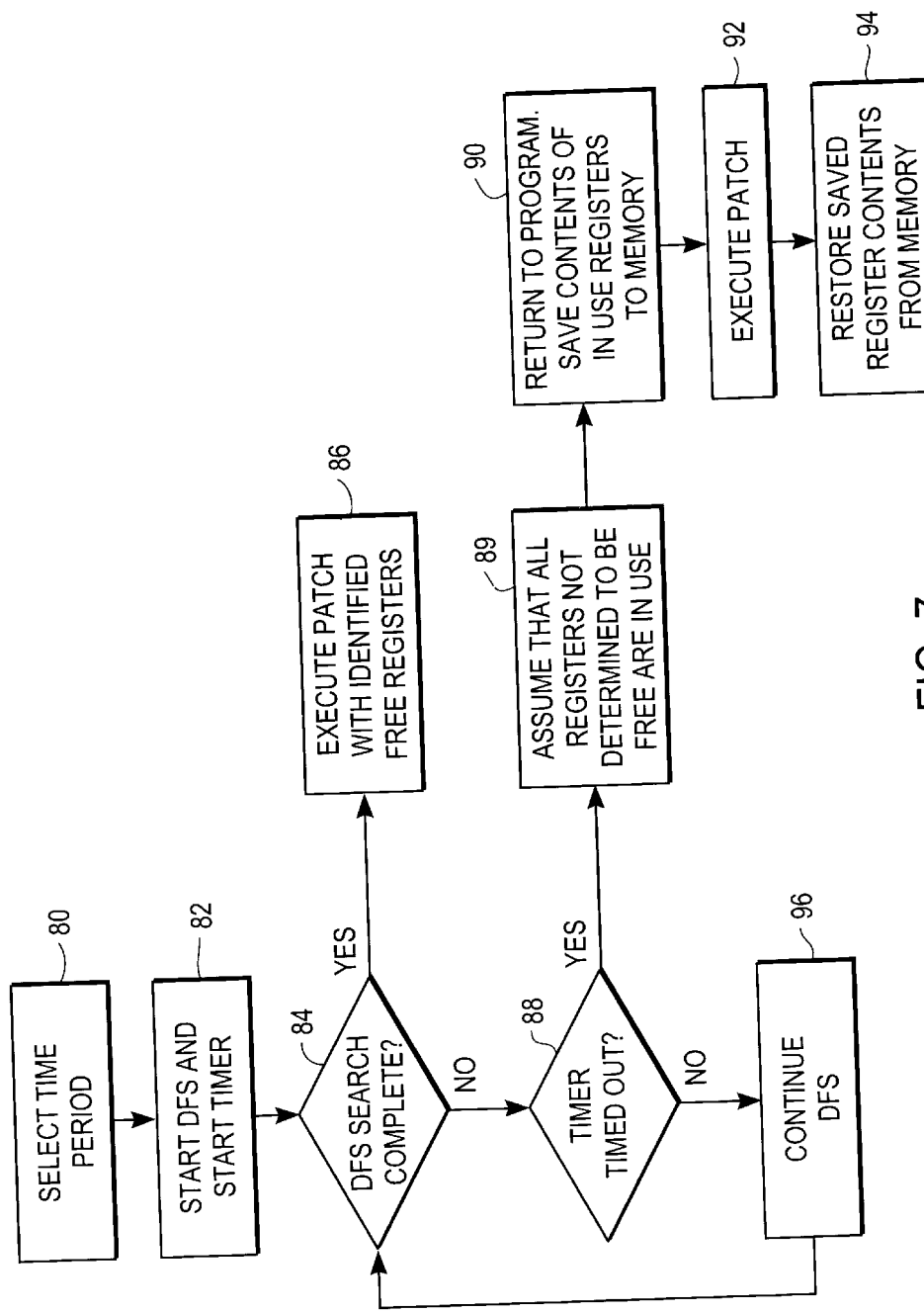
FIG. 7 is a flow diagram illustrating the use of a timer in connection with a depth first search of the present invention.

The DFS may be timed so as to terminate within a designated period of time. FIG. 7 is a flow diagram illustrating the use of a timer in connection with the DFS of the present invention. An example of pseudo-code for implementing the method illustrated in FIG. 7 is shown in Appendix B. A period of time is selected at step 80. This time period depends on the time criticality of the program. For example, the more time critical the operation, the smaller will be the amount of time that the DFS is allowed to proceed in the search for free registers. However, the predetermined searching time may he balanced against the time savings associated with not having to save and restore registers to/from memory associated with conventional patch execution.

At step 82, the DFS and the timer start. At step 84, if the DFS is finished, the patch is executed at step 86 with the identified free registers. Otherwise, a determination is made whether the timer has timed out at step 88. If the time period has expired, an assumption that all registers not yet determined to be free are in use is made in step 89, and the execution of the program continues, and the contents of the in use registers needed for the patch are saved to memory at step 90. The patch executes at step 92, and upon completion of the patch, the contents of the saved registers are restored from memory at step 94. If the timer has not timed out at step 88, the DFS continues at step 96 and the process loops back to step 84.

The execution of a patch normally requires a certain number of registers. Typically, the number of registers is small. As described above, registers which are free at a designated point in the program execution can be determined and later used during the patch execution. The patch is executed without saving and restoring these registers. By using free registers, less processing time is required in executing the patch.

Figure 1:
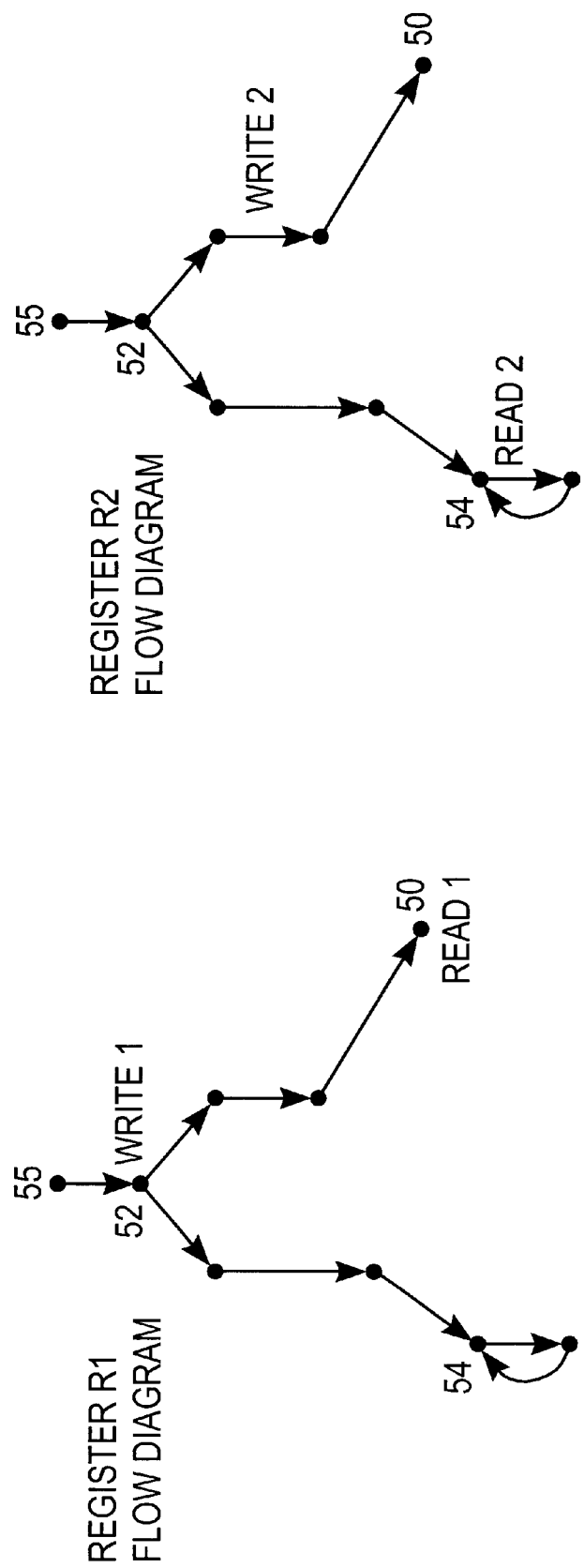
FIG. 1 shows the conventional graphing of program flow used to locate free registers during program compilation for two particular registers.
Figure 2:
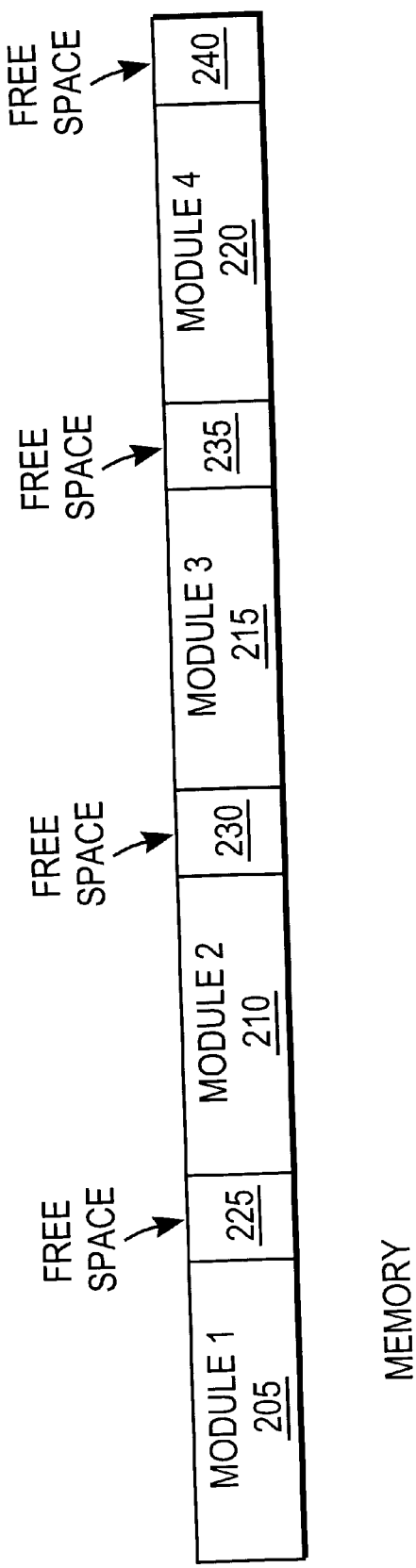
FIG. 2 illustrates a conventional program mapping to memory.
Figure 3:
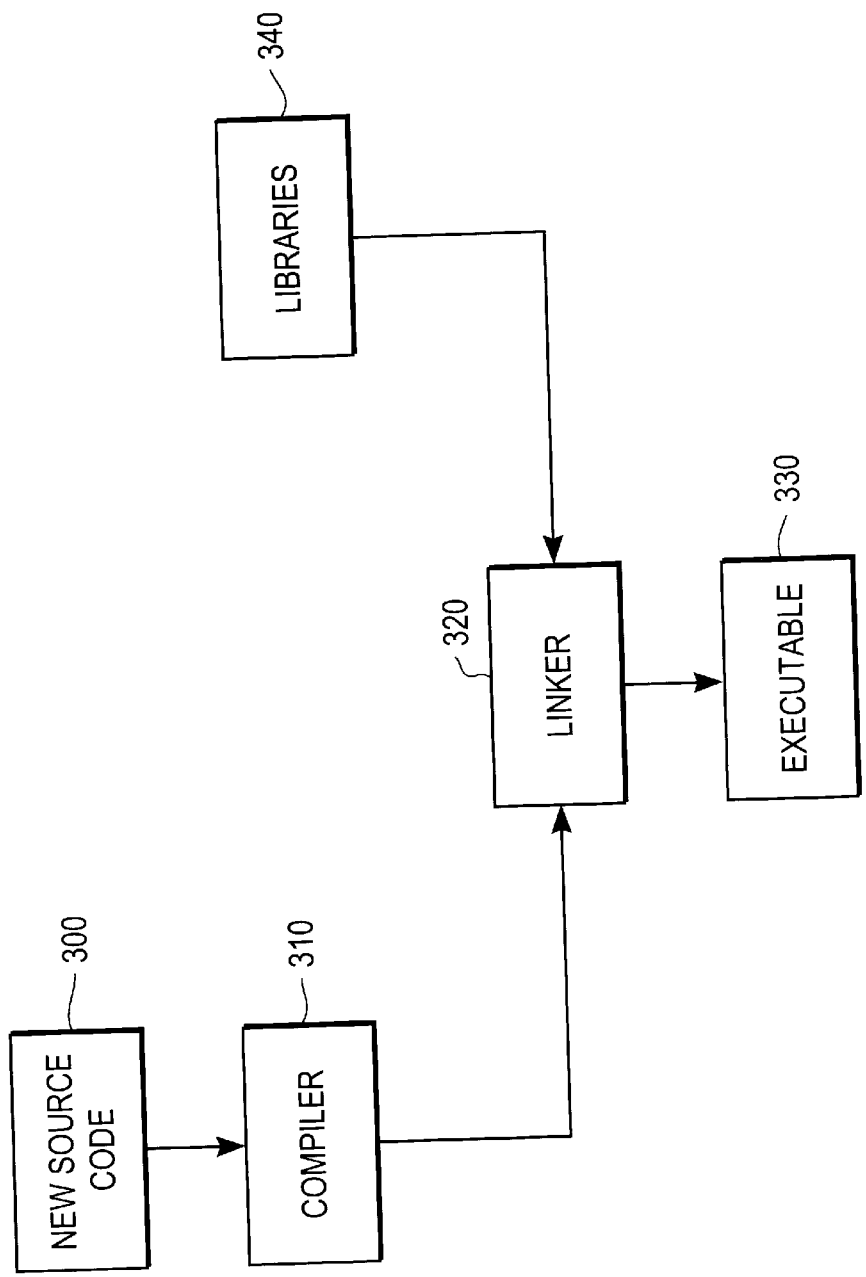
FIG. 3 is a block diagram illustrating a conventional system for linking a patch with an executable program.
Figure 4:
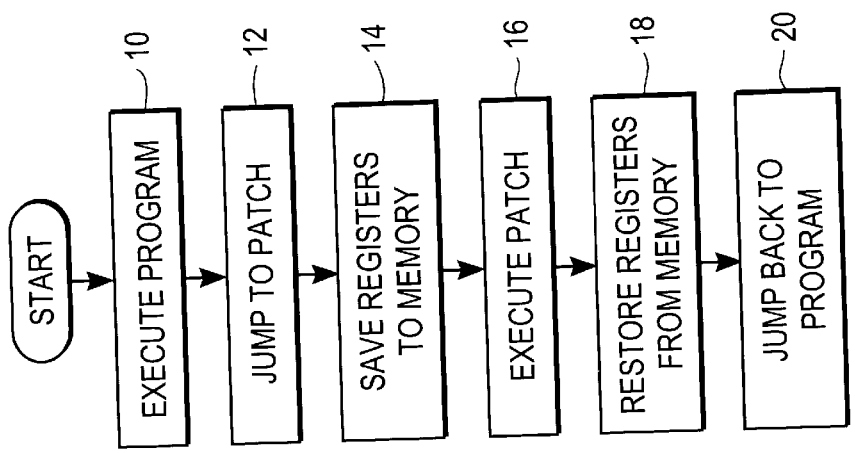
FIG. 4 is a flow diagram of the conventional steps in executing a software patch.

As discussed previously, and with reference to FIG. 2, free memory space is often utilized for patches. However, in many instances, the amount of free space is limited, and it may be advantageous or necessary to re-use patches whenever possible. This can he done only if the registers utilized in executing a particular instance of a patch are free at instances where a jump to the patch occurs. In such situations, the time spent searching for free registers meeting the "re-use" requirements can be balanced against how often the patch is executed.

For example, assume that the program 79 includes three stored patches, P1, P2 and P3. With reference to FIG. 8, patch P1 utilizes registers R2, R5 and R7. Patch P2 utilizes registers R3, R5 and R8, and patch P3 utilizes registers R6, R7 and R8.

Assume that all three of these patches are instances of the same patch. That is, P1, P2, and P3 contain identical instructions which utilize different registers. At point A in the program, a patch requiring the same instructions as P1, P2 and P3 is called, and the free registers at this point in the program are found to be R2, R3, R6, R7 and R8. In this situation, patches P1 and P2 may not be utilized without saving and restoring registers since R5, which is used by both P1 and P2, is not free. However, patch P3 may be used, because R6, R7 and R8 are all free at point A. Therefore, patch P3 may be re-used. This re-use of patch P3 allows the program to save free memory space, because a duplicate patch does not have to be stored in memory.

Additionally, when the same patch may be required many times within a program, it may, depending on the implementation, be beneficial and acceptable to increase the time spent searching for free registers which are free at all or multiple points of interest, because the time saved by not having to store and restore registers to/from memory is multiplied by the number of times that the particular patch is used. This is particularly true in cases where the patch is executed in a loop with many iterations. Free registers can, if desired, be identified at multiple points of interest simultaneously. The free register names for the multiple points may then be saved in respective sets.

In an alternative embodiment, the search for free registers may identify free registers at each point within a program. A "backwards" search of the entire graph may be performed, thereby locating free registers for each point in the program. During this backwards search, it is assumed that an EndRoot exists such that every point in the program can reach the EndRoot. If this is not the case, due to non-terminating loops or leaves, imaginary edges to the EndRoot are added to the graph. The added edges from points in such loops are assumed clean with respect to all registers, while the edges added from leaves satisfy Read(i) with respect to every register "i". An example of pseudo-code for implementing such a global search is illustrated in Appendix C.

Figure 9:
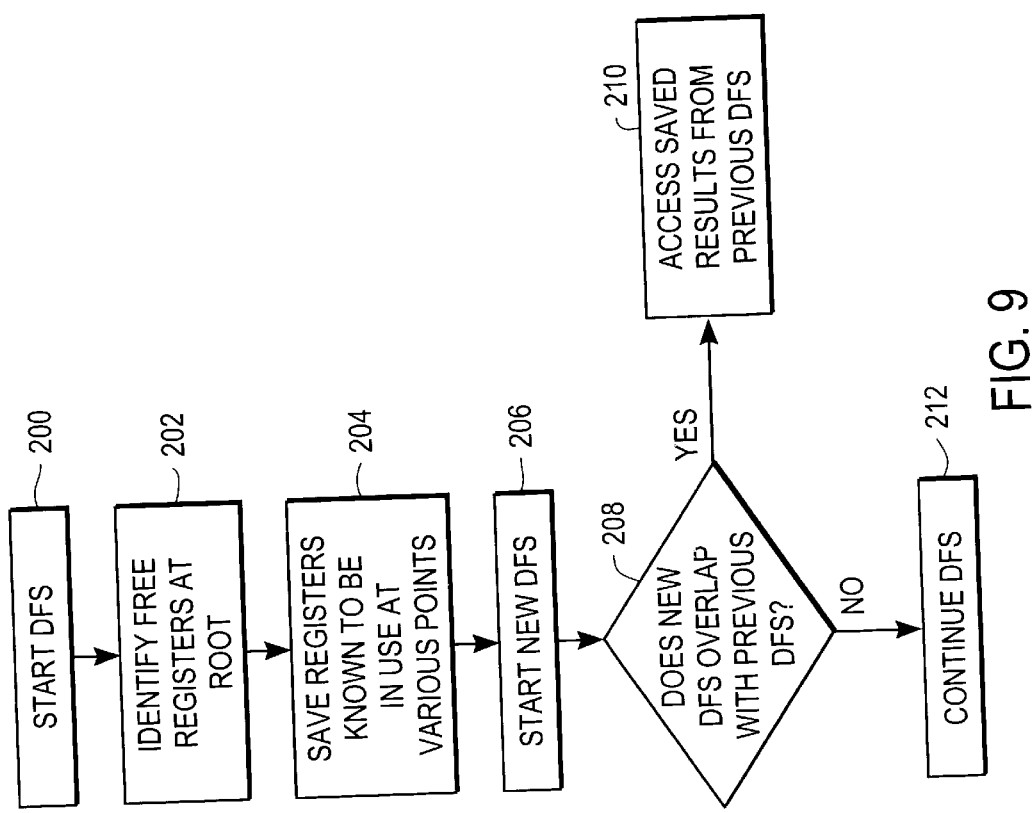
FIG. 9 is a flow diagram illustrating a use of previous search results in accordance with the present invention.

In a further alternative, the results of previous searches for free registers from a previous point of interest can also be saved. FIG. 9 is a flow diagram illustrating a method for using previous search results to reduce search time. An example of pseudo-code for implementing such a local search with information saving is illustrated in Appendix D.

A DFS starts at step 200. The free registers at Root are identified at step 202 in the process certain registers are identified or being in use at various points. This information is saved at step 204. A second DFS starts at step 206 from a new Root, and a determination is made at step 208 whether the new DFS overlaps with the previous DFS performed at step 200. If the answer to the determination in step 208 is "yes," at step 210 the current DFS may access the results saved in step 204. Otherwise, the DFS continues at step 212 and saves additional in-use registers as discovered.

For example, if the previous saved search results indicate that register R1 is not free at a certain point of interest and the current search overlaps the point where register R1 was found to be not free, then the current search also identifies register R1 as not free. The search associated with register R1 terminates thereby reducing the time spent searching for free registers.

Figure 10:
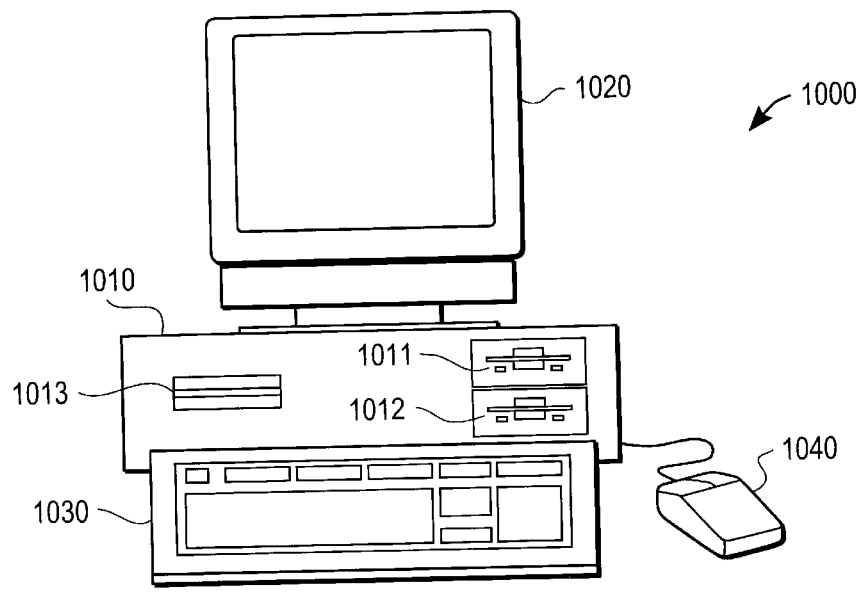
FIG. 10 is a diagram of a computer system in which the present invention may be utilized.
Figure 11:
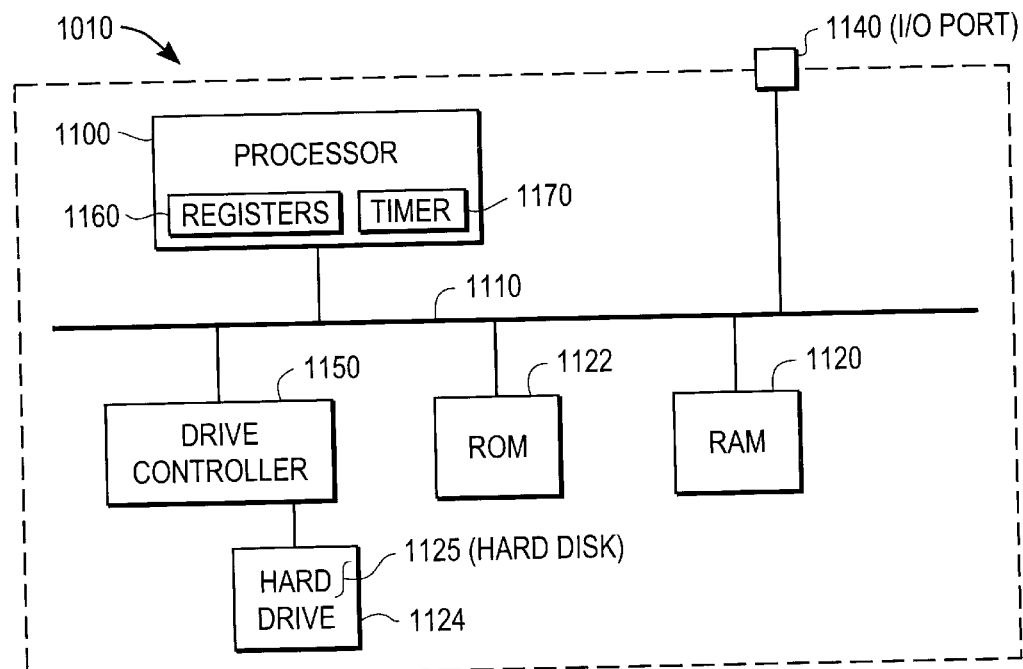
FIG. 11 is a block diagram illustrating the computer system of FIG. 10.

FIGS. 10 and 11 depict an exemplary computer system suitable for implementing the present invention. The computer can be of any type, e.g., a laptop, a personal computer, workstation, minicomputer, or mainframe computer. The computer processor could, for example, be an ALPHA™ processor. It would be recognized that the computer configuration is exemplary and that other components (not shown) could be added or substituted for those depicted and certain of the depicted components could be eliminated if desired.

The computer processor and memory function to identify registers and save register addresses as described above with reference to FIGS. 5–6 and in accordance with stored programming instructions which drive its operation. Preferably the computer stores its unique programming instructions on the ROM or hard disk. It should be recognized that only routine programming is required to implement the instructions required to drive the computer to operate in accordance with the invention, as described above. Further, since the computer components and configuration are conventional, routine operations performed by depicted components will generally not be described, such operations being well understood in the art.

Referring to FIG. 10, the computer 1000 includes a main unit 1010 with slots 1011, 1012 and 1013, respectively provided for loading programming or data from a floppy disk and/or compact disc (CD) onto the computer 1000. The computer 1000 also includes a keyboard 1030 and mouse 1040 which serve as user input devices. A monitor display 1020 is also provided to visually communicate information to the user.

As depicted in FIG. 11, the computer 1000 has a main processor 1100 which is interconnected via bus 1110 with various storage devices including random access memory (RAM) 1120, read only memory (ROM) 1122 and hard drive 1124 which has an associated hard disk 1125, all of which serve as storage media on which computer programming or data can be stored for access by the processor 1100. The processor 1100 includes memory registers 1160 which function as a working memory for the processor 1100. These registers 1160 may include free registers that are identified in accordance with the system and method of the present invention. A drive controller 1150 controls the hard drive 1124. It will be understood that other components may be connected if desired to the bus 1110. Also depicted in FIG. 11 is an I/O port 1140 connected with the bus 1110 for receiving/transmitting signals from/to outside the computer system. By accessing the stored computer program, the processor 1100 is driven to operate in accordance with the present invention. The processor 1100 may also include a timer 1170 which operates to time a predetermined period in which the search for free registers may proceed in accordance with one aspect of the invention. The timer may alternatively be an external timing device which operates to signal the processor to terminate the search for free registers upon time out of the predetermined period.

The interoperation of the various components of the computer depicted in FIGS. 10 and 11 in implementing the invention as described above will now be discussed. The processor executes a program stored in RAM 1120, for example. The program encounters an instruction which calls, jumps or branches to a patch. The program then starts the DFS algorithm discussed above with respect to the set of registers. The search may proceed until a timer times out. Free registers located may then be assigned to and utilized to execute the patch to avoid storing and restoring contents of registers in order to execute the patch. In other words, the patch is compiled to use the free registers located. The patch is then executed by writing patch data in the free registers. After execution of the patch is completed a jump is made to the program at a point subsequent to the point at which the patch was inserted or called. At this point, execution of the program continues by reading written program data from the registers.

A system and method for locating free registers in a program has been described. An advantage of the invention is that free registers are located dynamically at a designated part of the program in an efficient manner. Another advantage is that in time critical operations, the benefit of locating free registers can be weighed against the time spent searching for the free registers. In this disclosure, there are shown and described only the preferred embodiments of the invention, but as aforementioned, it is to be understood that the invention is capable of use in various other combinations and environments and is capable of changes or modifications within the scope of the invention as expressed and claimed herein.

APPENDIX A

Local search for free registers.

1. algorithm Local Search
2. LS := Procedure (v, R)
3. (* R is a set of registers for which there are free paths from Root to v. The procedure returns a subset of R determined to be not-free.*)
4.    Local NewlyDead, R', $R_{new}$.
5.    $R_{new}$ := R - Visited(v);
6.    Visited(v) := Visited(v) ∪ R;
7.    if v is a leaf or $R_{new}$ = ∅ then
8.      NewlyDead := $R_{new}$;
9.      return NewlyDead
10.    fi;
11.    NewlyDead := ∅;
12.    for I ∈ Succ(v) do
13.      R' := $R_{new}$;
14.      for i ∈ $R_{new}$ do
15.        if read(i, (v, I)) then
16.          NewlyDead := NewlyDead ∪ {i};
17.          R' := R' \ {i}
18.        fi;
19.        if write(i, (v, I)) then R' := R' \ {i} fi;
20.      od;
21.      NewlyDead := NewlyDead ∪ LS(I, R');
22.      $R_{new}$ := $R_{new}$ \ NewlyDead;
23.    od;
24.    return NewlyDead
25. end The calling sequence for this procedure is 1. for v ∈ V do Visited(v) := ∅ od;
2. Free := AllRegisters \ LS(Root, AllRegisters);

APPENDIX B

Local search for free registers with time outs.

1. algorithm Local Search
2. LS := Procedure (v, R)
3. (* R is a set of registers for which there are free paths from Root to v. The procedure returns a subset of R determined to be not-free.*)
4.    Local NewlyDead, R', $R_{new}$.
5.    if TimeOut then return R fi
6.    $R_{new}$ := R - Visited(v);
7.    Visited(v) := Visited(v) ∪ R;
8.    if v is a leaf or $R_{new}$ = ∅ then
9.      NewlyDead := $R_{new}$;
10.      return NewlyDead
11.    fi;
12.    NewlyDead := ∅;
13.    for I ∈ Succ(v) do
14.      R' := $R_{new}$;
15.      for i ∈ $R_{new}$ do
16.        if read(i, (v, I)) then
17.          NewlyDead := NewlyDead ∪ {i};
18.          R' := R' \ {i}
19.        fi;
20.        if write(i, (v, I)) then R' := R' \ {i} fi;
21.      od;
22.      NewlyDead := NewlyDead ∪ LS(I, R');
23.      $R_{new}$ := $R_{new}$ \ NewlyDead;
24.    od;
25.    return NewlyDead
26. end The calling sequence for this procedure is 1. for v ∈ V do Visited(v) := ∅ od;
2. Free := AllRegisters \ LS(Root, AllRegisters);

APPENDIX C

Global search for free registers.

1. algorithm Global Search
2. GS := Procedure (v, R)
3. (* R is a subset of the registers in use at v. *)
4.    if R ⊆ Visited(v) then return fi;
5.    Visited(v) := Visited(v) ∪ R
6.    for I ∈ Pred(v) do
7.      R' := R;
8.      for i ∈ AllRegisters do
9.        if write(i, (I, v)) then R' := R' \ {i};
10.        if read(i, (I, v)) then R' := R' ∪ {i};
11.      od
12.      GS(I, R')
13.    od
14. end The calling sequence for this procedure is 1. for v ∈ V do Visited(v) := ∅; Dead(v) := ∅; od;
2. GS(EndRoot, ∅)

APPENDIX D

Local search for free registers with information saving.

1. algorithm Local Search 2
2. LS2 := Procedure (v, R)
3. (* R is a set of registers for which there are free paths from Root to v. The procedure returns a subset of R determined to be not-free.*)
4.    Local NewlyDead, R', $R_{new}$.
5.    $R_{new}$ := R - Visited(v);
6.    Visited(v) := Visited(v) ∪ R;
7.    if v is a leaf or $R_{new}$ = ∅ then do
8.      Dead(v) := Dead(v) ∪ $R_{new}$;
9.      return R ∩ Dead(v)
10.    fi;

APPENDIX D-continued

Local search for free registers with information saving.

```
11.     for I ∈ Succ(v) do
12.       R' := R_new;
13.       for i ∈ R_new do
14.         if read(i, (v, I)) then
15.           Dead(v) := Dead(v) ∪ {i};
16.           R' := R' \ {i}
17.         fi;
18.         if write(i, (v, I)) then R' := R' \ {i} fi;
19.       od;
20.       Dead(v) := Dead(v) ∪ LS2(I, R');
21.     od;
22.     return R ∩ Dead(v)
23.   end
```

The calling sequence for this procedure is

```
1.   for v ∈ V do Visited(v) := ∅; Dead(v) := ∅; od;
2.   LS2(point_1, AllRegisters);
3.   for v ∈ V do Visited(v) := Dead(v); od;
4.   LS2(point_2, AllRegisters);
5.   for v ∈ V do Visited(v) := Dead(v); od;
6.   LS2(point_3, AllRegisters);
7.   for v ∈ do Visited(v) := Dead(v); od;
8.   . . .
```

What is claimed is:

1. A method for locating free registers within a plurality of registers, comprising the steps of:

selecting a point of interest within an execution flow of a program;

determining, during execution of the program, a subset of the plurality of registers that are written prior to being read during all possible execution flows of a portion of the program subsequent to the identified point of interest;

identifying the subset of registers as free registers;

determining, during continued execution of the program, whether an instruction writes data to one or more registers within the identified subset of free registers; and executing the instruction without storing data to be overwritten by the instruction if the one or more registers are determined to be within the identified subset of free registers during execution of the program.

2. A method according to claim 1, wherein the point of interest occurs in the execution flow at a jump or branch instruction.

3. A method according to claim 1, wherein the determining step is performed concurrently for the plurality of registers.

4. A method according to claim 1, further comprising the step of:

storing names of registers identified as in use registers.

5. A method according to claim 1, further comprising the step of:

terminating the determining step associated with a particular register when that particular register is identified as not being a free register.

6. A method according to claim 1, further comprising the step of:

establishing a threshold time period;

wherein the determination of the subset of registers that are written prior to being read during all possible execution flows of the program subsequent to the point of interest selected is made within the threshold time period.

7. A method according to claim 1, wherein the point of interest is a first point of interest, and further comprising the steps of:

selecting a nth point of interest within an execution flow of a program;

determining a nth subset of the plurality of registers program subsequent to the nth point of interest; and identifying the nth subset of registers as free registers.

8. A method according to claim 7, wherein the determining of a nth subset of the plurality of registers is performed concurrently for the plurality of registers.

9. The method according to claim 7, wherein said determining a nth subset includes utilizing information about in-use registers collected for all points of interest previous to the nth point of interest.

10. The method according to claim 7, wherein said steps of selecting all points of interest and determining all subsets of the plurality of registers are performed concurrently.

11. A computer-readable medium having stored thereon a plurality of sequences of instructions, said plurality of sequences of instruction including sequences of instructions which, when executed by a processor, cause said processor to:

receive an input representing a point of interest within an execution flow of a program;

determine, during execution of the program, a subset of a plurality of registers that are written prior to being read during all possible execution flows of a portion of the program subsequent to the identified point of interest;

identify the subset of registers as free registers; and modify execution of the program subsequent to the identified point of interest with respect to usage of at least one of the identified subset of free registers during execution of the program.

12. The computer-readable medium of claim 11, wherein said plurality of sequences of instructions includes sequences of instructions that, when executed by said processor, cause said processor to:

simultaneously determine, for all of the plurality of registers are written prior to being read during all possible execution flows of a portion of the program subsequent to the identified point of interest.

13. The computer-readable medium of claim 11, wherein said plurality of sequences of instructions includes sequences of instructions that, when executed by said processor, cause said processor to:

store names of identified in-use registers.

14. The computer-readable medium of claim 11, wherein said plurality of sequences of instructions includes sequences of instructions that, when executed by a procecessor, cause said processor to:

establish a threshold time period, and complete the determination of the subset of registers that are to be written prior to being read is made within the threshold time period.

15. The computer-readable medium of claim 11, wherein the point of interest is a first point of interest, and said plurality of sequences of instructions further cause said processor to:

select a nth point of interest within an execution flow of a program;

determine a nth subset of registers that are written prior to being read during all possible execution flows of the program subsequent to the nth point of interest; and identify the nth subset of registers as free registers.

16. A computer system comprising:

one or more processors;

a plurality of registers operably associated with said one or more processors;

memory;

a keyboard;

a bus for coupling said one or more processors to said memory;

means for selecting a point of interest within an execution flow of a program stored in said memory;

means for determining, during execution of the program, a subset of said plurality of registers that are written prior to being read during all possible execution flows of a portion of the program subsequent to the identified point of interest;

means for identifying said subset of registers as free registers; and means for modifying execution of the program at or subsequent to the indentified point of interest with respect to usage of at least one of the identified subset of free registers during execution of the program.

17. The computer system according to claim 16 wherein the point of interest occurs in the execution flow at a jump or branch.

18. The computer system according to claim 16 wherein said means for determining includes means for determining a subset of said plurality of registers concurrently for said plurality of registers.

19. The computer system according to claim 16 further comprising means for storing names of the subset of registers identified as in use registers.

20. The computer system as recited in claim 16 further comprising means for terminating said means for determining for a particular register when that particular register is identified as not being a free register.

21. The computer system as recited in claim 16 further comprising a timer for establishing a threshold time period in which said means for determining has to determine the subset of registers.

22. The computer system as recited in claim 16 wherein the point of interest is a first point of interest and further comprising:

means for selecting a nth point of interest within an execution flow of the program;

means for dynamically determining, during execution of the program, a nth subset of the plurality of registers written prior to being read during all possible execution flows of a nth portion of the program subsequent to the identified nth point of interest; and means for identifying the nth subset of registers as free registers.

23. The computer system as recited in claim 22 wherein said means for determining includes means for determining the nth subset concurrently for the plurality of registers.

24. The computer system as recited in claim 22 wherein said means for determining includes means for utilizing information about in use registers collected for all points of interest previous to the nth point of interest.

25. The computer system as recited in claim 22 wherein selecting all points of interest, by said means for selecting, and determining of all subsets of the plurality of registers, by said means for determining, are performed concurrently.

26. A method for dynamically identifying free registers within a plurality of registers, comprising the steps of:

initiating a timer;

selecting a point of interest within an execution flow of a program;

determining, during execution of the program, a subset of the plurality of registers that are written prior to being read during all possible execution flows of the portion of the program subsequent to the identified point of interest, each of the plurality of registers within the subset being determined concurrently;

identifying the subset of the plurality of registers as free registers;

terminating the determining step associated with a particular register if the particular register is identified as not being a free register;

terminating the step of determining a subset of the plurality of registers if the timer exceeds a threshold time interval; and modifying execution of the program at or subsequent to the identified point of interest with respect to usage of at least one of the identified subset of free registers during execution of the program.

27. The method of claim 1, further including:

inserting a patch at a point within the execution flow of the program to use the one or more of the identified free registers; and executing the patch.

28. The method of claim 27, including, while executing the program, reading data from at least one of the plurality of registers without saving the data prior to executing the patch and without restoring the data to at least one of the plurality of registers after executing the patch.

29. The method of claim 27, further including storing an associated jump instruction for jumping to the patch at the point in the execution flow of the program where the patch is inserted, and jumping to the patch at each subsequent execution of the jump instruction.

30. The method of claim 27, wherein the point is a first point and the patch is a first patch, and the method further includes:

determining free registers at a nth point in the execution flow of the program;

determining whether the registers used by the first patch are a subset of the free registers at hte nth point in the execution flow of the program; and executing a nth patch by re-using the first patch when it is determined that the registers used by the first patch are subset of the free registers at the nth point in the execution flow of the program.

\* \* \* \* \*

UNITED STATES PATENT AND TRADEMARK OFFICE
CERTIFICATE OF CORRECTION

PATENT NO.     : 6,438,740 B1
DATED          : August 20, 2002
INVENTOR(S)    : Broder et al.

It is certified that error appears in the above-identified patent and that said Letters Patent is hereby corrected as shown below:

Column 11,
Line 36, after ";", insert -- and --;
Replace lines 37-39, with the following text:
-- modifying execution of the program at or subsequent to the identified point of interest with respect to usage of at least one of the identified subset of free registers during execution of the program. --
Delete lines 40-44;

Column 12,
Line 21, delete "instruction", and insert -- instructions --;
Line 31, after "program", insert -- at or --;
Lines 39-40, after "registers", insert -- , which of the plurality of registers --;
Line 54, delete "to be";
Line 54, delete "is made";

Column 13,
Line 19, delete "indentified", and insert -- identified --;

Column 14,
Line 49, delete "nth", and insert -- the --;
Line 53, after "are", insert -- a --.

Signed and Sealed this

Twenty-eighth Day of October, 2003

JAMES E. ROGAN
*Director of the United States Patent and Trademark Office*